Patented June 5, 1928.

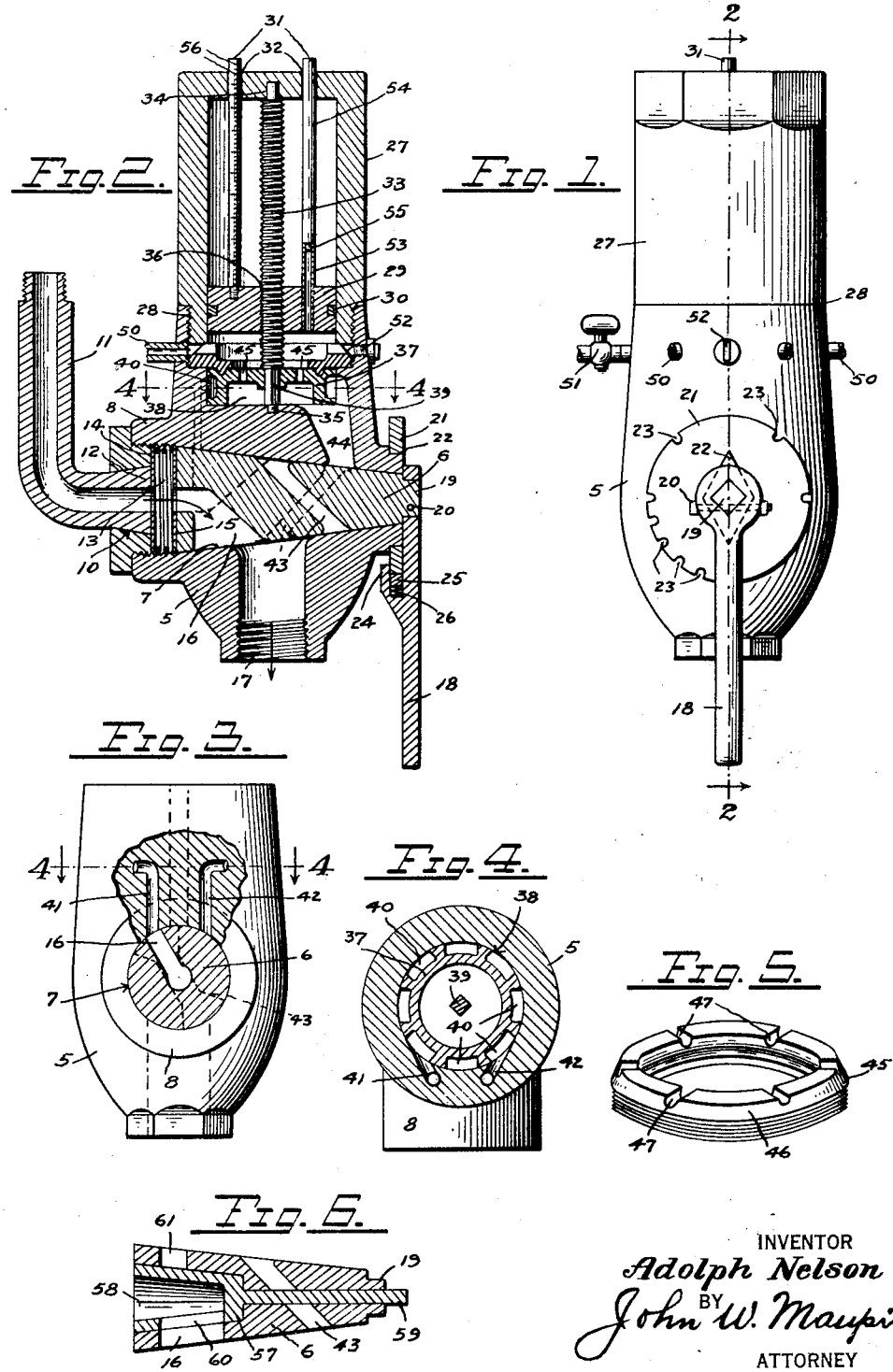

1,672,079

UNITED STATES PATENT OFFICE.

ADOLPH NELSON, OF SEATTLE, WASHINGTON.

AUTOMATIC LUBRICATING VALVE.

Application filed November 29, 1926. Serial No. 151,553.

My invention relates to automatic lubricating valves and is an improvement over my prior United States Patent No. 1,538,646, issued May 19, 1925. The principal objects of my invention are to provide a lubricating valve that may be readily attached to cylinders, air drill machines and the like, and whereby a jet of steam or compressed air that is absolutely controlled by a valve handle may be passed through the valve and automatically feed the oil or grease to the cylinder, machine, or other part that is to be lubricated. Further objects are to provide independent means for lubricating the auxiliary parts of an engine, and novel means for filling the device with lubricant. Other objects are to provide a lubricating valve that is simple and durable in construction, reliable and efficient in operation, and which may be manufactured at comparatively small cost.

Some of the advantages of my lubricating valve reside in the fact that grease, hard oil and other crude lubricants may be used thus effecting a material saving in the lubricating cost. The use of grease as a lubricant is particularly advantageous in the fact that it prevents rust and does not burn or otherwise deteriorate the engine packing as does machine oil. The use of grease on engines that are to be out of use for any considerable time eliminates the necessity of taking them apart for cleaning and oiling when again put into use. The use of hard oil is especially desirable in the fact that it adheres to the surfaces and there is no waste, while cylinder, machine and other light oils are thrown off by centrifugal force and are blown off by the exhaust of air from drilling apparatus. The use of grease and hard oil as lubricants for drilling apparatus prevents them from being sprayed or deposited on ore and carrying ore values away in flotation where ore is milled, and also prevents the objectionable formation of cylinder oil fog which is so injurious to the lungs of mine operators.

With the foregoing and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in rear elevation of my lubricating valve;

Fig. 2 is a view in central vertical section taken substantially on a broken line 2, 2 of Fig. 1;

Fig. 3 is a view in front elevation of the lower valve casing with parts broken away;

Fig. 4 is a view in horizontal section taken substantially on a broken line 4, 4 of Figs. 2 and 3;

Fig. 5 is a view in perspective of the distributing member; and

Fig. 6 is a view in central vertical longitudinal section of a modified form of plug valve.

Referring to the drawings throughout which like reference numerals designate like parts, the numeral 5 indicates the lower valve casing member as a whole and having a conically tapered plug valve member 6 rotatively mounted within a correspondingly tapered chamber 7. The intake end of said chamber is provided with an annular projection 8 that is internally threaded to receive a reducer 9 that is centrally provided with an inwardly tapered opening 10. An intake elbow 11 has its inner end tapered at 12 to fit within said tapered opening and a spring 13 with washer rings 14 and 15 in abutment with the inner wall of said reducer and the outer end of said plug valve member respectively are adapted to hold the tapered end of said elbow against its conical seat and at the same time permit said valve and elbow members to be revolved freely as will be readily understood.

In the position of the plug valve member 6 shown in Fig. 2 of the drawings the openings through the elbow pipe 11 and washers 14 and 15 are in alignment with a steam passage 16 through said plug valve and said passage registers with the outlet or delivery passage 17 concentrically disposed in the bottom of the lower valve casing member 5. It will thus be obvious that when said elbow pipe is connected with the supply source of pressure, such as a boiler, air compressor tank or the like, and said delivery end passage is connected to the cylinder, machine or other part to be lubricated, the steam or compressed air will pass freely through with no effect in so far as lubrication is concerned. It will be understood that said elbow pipe and reducer may be removed and a supply pipe connected directly with the threaded projection 8 if so desired.

The position of the plug valve member 6 is controlled by a handle 18 that is held on the square reduced end 19 of said plug valve by a pin 20. A dial plate 21 interposed between said handle and an angular shoulder 22 and held securely in place thereby is provided with a plurality of notches 23. Said handle is provided on its inner face with a finger 24 that slidably engages the inner face of said plate when the handle is rotated, and a pin 25 impelled by a spring 26 seated in a pocket adjacent said finger is arranged to engage said notches and serve as a stop for the handle at predetermined points.

The upper portion of the device comprises a cylinder 27 which serves as a reservoir for the lubricant and which is threadedly secured to the valve casing member 5 at 28. A piston 29 provided with a piston ring 30 is adapted to travel up and down within said cylinder and is prevented from rotary movement by guide rods 31 threadedly secured therein and slidably passing through holes 32 in the top of the cylinder that permit the outlet or intake of air as said piston moves up or down. A threaded stem 33 with its upper end rotatively mounted in the top of the cylinder at 34 and its lower end rotatively mounted in the valve casing 5 at 35 passes centrally through a threaded hole 36 in said piston and causes same to move up or down thereon in accordance with the direction in which said stem is rotated.

The means for rotating the stem 33 comprises a rotor member 37 revolubly seated in an annular recess 38 in the upper portion of the valve casing 5 and secured to a lower square portion 39 of said stem. Said rotor is provided with a plurality of spaced steam pockets 40. Two small conduits 41 and 42, leading vertically upward from the tapered chamber 7 and adapted to register with the steam passage 16 when the plug valve 6 is rotated, have their upper end portions deflected at right angles so as to be directed tangentially on either side of said rotor respectively toward said pockets as clearly shown in Fig. 4 of the drawings.

By turning the plug valve 6 until the passage 16 registers with the conduit 41 as shown in dotted lines in Fig. 2 and also in Fig. 3 the jet of steam or compressed air will cause the rotor 37 to revolve turning the threaded stem 33 in a clockwise direction and causing the piston 29 to move downwardly. The down passage 43 through said plug valve is flared or enlarged at both of its ends as shown in dotted lines in Fig. 3 and its lower end will register with the outlet passage 17 while its upper end will register with the passage 44 that extends from the tapered chamber 7 to the annular recess 38.

As the piston 29 moves downwardly the grease or oil that fills the cylinder 27 below same will be squeezed downwardly through small apertures 45 in the rotor 37, then through the passages 44 and 43 and through the outlet 17 to the parts to be lubricated. The passage 44 is sufficiently large at its upper end to also serve as an exhaust for the steam or compressed air from the pockets 40 and the steam or air will mix with the oil or grease and carry it along in its downward passage.

The means for lubricating auxiliary parts of an engine comprises a distributor ring member 45 that is beveled all around its upper peripheral edge portion, as at 46, and provided with a plurality of spaced slots 47. Said member is threaded so that it may be screwed down and rest on a shoulder 48 in the upper portion of the valve casing 5. The lower flange of the cylinder 27 engages its upper surface and forms an annular recess 49 in conjunction with its beveled portion as shown in Fig. 2.

The annular recess 49 serves as a manifold for the lubricant that is squeezed therein through the slots 47. A plurality of small pipes 50 leading from said recess or manifold conveys the lubricant to such auxiliary engine parts as may be desired for lubrication. Each of said pipes may be provided with a stopcock as shown at 51 in Fig. 1 for the purpose of controlling the flow of lubricant therethrough.

A screw plug 52 may pass through the casing 5 and engage one of the slots 47 thus serving as a means for preventing the member 45 from turning and also as a side port for filling the cylinder with lubricant when said plug is removed. Prior to filling said cylinder it will be understood that the plug valve 6 is turned until the passage 16 registers with the conduit 42 when the steam or air pressure will cause the threaded stem 33 to lift the piston 29 to its uppermost position.

As a means for filling the cylinder 27 from its top the lower portion 53 of one of the guide rods 31 is hollow and extends entirely through the piston 29. When said piston is in its uppermost position the hollow portion of said rod will project slightly above the top of said cylinder. The solid portion 54 of said rod may then be unscrewed at 55 and the lubricant inserted into said cylinder through said hollow portion. Graduations 56 may be marked on one of said guide rods and serve as a means for indicating the amount of lubricant within the cylinder and the amount used at each application as will be readily understood.

In the modified form shown in Fig. 6 the plug valve member 6 is provided with an inner member 57 that has an enlarged hollow portion 58 and a stem 59 extending through said outer member whereby same may be turned independently of the outer valve member. When said inner valve member is turned one hundred and eighty degrees from the position shown the outlet 60 will register with the passage 61 and steam or air may pass upwardly to operate the device as hereinbefore described. The advantage in this modified construction is that the means for lubricating auxiliary engine parts may be operated without using the main lubricating system.

Having thus described my invention what I claim and desire to secure by Letters Patent of the United States is:—

1. A lubricating valve comprising a casing, a cylinder, a piston, a plug valve member adapted to control the admission and discharge of a pressure medium, turbine rotor means whereby said pressure medium is caused to move said piston up or down, and guides adapted to prevent the piston from turning on its axis.

2. A lubricating valve comprising a casing, a cylinder, a piston, a plug valve member adapted to control the admission and discharge of a pressure medium, turbine rotor means whereby said pressure medium is caused to move said piston up or down within the cylinder, guides adapted to prevent the piston from turning on its axis, and graduations on one of said guides.

3. A lubricating valve comprising a casing, a cylinder, a piston, a plug valve member adapted to control the admission and discharge of a pressure medium, turbine rotor means whereby said pressure medium is caused to move said piston up or down within the cylinder, guides adapted to prevent the piston from turning on its axis, graduations on one of said guides, and means for filling the cylinder at its top and on its side.

4. A lubricating valve comprising a valve casing, a cylinder threadedly mounted on the casing, a piston within the cylinder, a threaded stem adapted to carry said piston up or down, a turbine rotor for said stem having apertures therethrough, a plug valve member mounted within a valve chamber, said casing having conduits leading from said chamber to said rotor and a down passage leading from said rotor to said valve chamber, said plug valve having two passages, one of said passages adapted to form a communication from the intake to the outlet of the casing and also from the intake to either of said rotor conduits, and the other passage arranged to form a communication between the down passage and the outlet and also to be closed against the wall of the valve chamber.

5. A lubricating valve comprising a valve casing, a cylinder threadedly mounted on the casing, a piston within the cylinder, a threaded stem adapted to carry the piston up or down, a turbine rotor for the stem having apertures therethrough, a plug valve revolubly mounted within the valve chamber, a handle for the valve, said valve casing having conduits leading from said chamber and opposingly directed tangentially toward said rotor, said casing having a down passage leading from said rotor to said valve chamber, said plug valve having two passages, one of said passages adapted to form a communication between the intake and outlet of the casing and also between the intake and either of said rotor conduits, the other valve passage arranged to form a communication between the down passage and the outlet and also to be closed against the wall of the valve chamber, and a distributor ring fixedly interposed between said rotor and piston and having a plurality of outlets through the casing.

In witness whereof, I hereunto subscribe my name this 22nd day of November A. D. 1926.

ADOLPH NELSON.